United States Patent
Montalvo et al.

(10) Patent No.: US 10,049,241 B2
(45) Date of Patent: Aug. 14, 2018

(54) SYSTEM FOR IDENTIFYING A LOCATION OF A MOBILE TAG READER

(71) Applicant: THOMSON LICENSING, Issy les Moulineaux (FR)

(72) Inventors: Luis Montalvo, Domloup (FR); Ali Louzir, Rennes (FR); Guillaume Bichot, La Chapelle Chaussee (FR); Philippe Gilberton, Geveze (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/529,119

(22) PCT Filed: Nov. 23, 2015

(86) PCT No.: PCT/EP2015/077368
§ 371 (c)(1),
(2) Date: May 24, 2017

(87) PCT Pub. No.: WO2016/083306
PCT Pub. Date: Jun. 2, 2016

(65) Prior Publication Data
US 2017/0262672 A1    Sep. 14, 2017

(30) Foreign Application Priority Data
Nov. 26, 2014    (EP) ..................................... 14306895

(51) Int. Cl.
*G06K 7/08*    (2006.01)
*G06K 7/10*    (2006.01)

(52) U.S. Cl.
CPC ..... *G06K 7/10376* (2013.01); *G06K 7/10316* (2013.01)

(58) Field of Classification Search
CPC ......................... G06K 7/0008; G06K 19/0723
(Continued)

(56) References Cited

U.S. PATENT DOCUMENTS 5,235,326 A * 8/1993 Beigel .................... G01V 15/00
340/10.34
7,299,810 B2    11/2007 Sugimoto
(Continued)

FOREIGN PATENT DOCUMENTS

CN    101957447    1/2011
CN    102279383    2/2011
(Continued)

OTHER PUBLICATIONS

Chatterjee et al., "Reducing Handover Failure Probability by Repetitive Scanning Process", 2012 International Conference on Communication, Information & Computing Technology, Mumbai, India, Oct. 19, 2012, pp. 1-6.
(Continued)

*Primary Examiner* — Jamara Franklin
(74) *Attorney, Agent, or Firm* — Brian J. Dorini; Joseph J. Opalach

(57) ABSTRACT

A radio frequency identification (RFID) reader identifies in which room among several rooms the RFID reader is more likely to be located. The RFID reader includes a transmitter for transmitting an interrogating radio frequency (RF) signal. It includes a receiver for receiving RF signals generated in corresponding pairs of RFID tags. The RFID tag pairs are attached to corresponding regions of each of the rooms. Each of said RFID tag pair including a first RFID tag and a second RFID tag that are spaced from each other by a distance that is larger or equal to $\lambda/4$ and smaller than or equal to $\lambda/2$ with respect to a frequency of a responding RF signal originated in the pair of RFID tags. A processor selects a larger RSSI of the RSSI's of the signal pair. The processor determines a corresponding sum of the RSSI's selected from each signal pair associated with each room. The processor evaluates in accordance with determined sums, the location in which said RFID reader is more likely to be located.

16 Claims, 4 Drawing Sheets

(58) Field of Classification Search
USPC .......................................................... 235/451
See application file for complete search history.

(56) References Cited

U.S. PATENT DOCUMENTS

| | | | |
|---|---|---|---|
| 8,102,813 | B2 | 1/2012 | Abhishek et al. |
| 8,165,087 | B2 | 4/2012 | Panabaker |
| 8,552,789 | B2 | 10/2013 | Kalhan |
| 2010/0328073 | A1 | 12/2010 | Nikitin et al. |
| 2011/0043373 | A1 | 2/2011 | Best et al. |

FOREIGN PATENT DOCUMENTS

| | | |
|---|---|---|
| CN | 102867163 | 1/2013 |
| CN | 103033180 | 4/2013 |
| EP | 2525554 | 11/2012 |
| EP | 2919446 | 9/2015 |
| WO | WO2005071597 | 8/2005 |
| WO | WO2013096037 | 6/2013 |

OTHER PUBLICATIONS

Anonymous, "EPC Radio-Frequency Identity Protocols Generation-2 UHF RFID", Specification for RFID Air Intefaces, Protocol for Communications at 860 MHz-960 MHZ, Version 2.0.0, GS1 EPCglobal Inc., Brussels, Belgium, Nov. 2013, pp. 1-152.

Mathie et al., "A pilot study of long-term monitoring of human movements in the home using accelerometry", Journal of Telemedicine and Telecare, vol. 10, No. 3, Jun. 2004. pp. 144-151.

Mishra et al., "An Empirical Analysis of the IEEE 802.11 MAC Layer Handoff Process", ACM SIGCOMM Computer Communication Review, vol. 33, No. 2, Apr. 2003, pp. 93-102.

Papapstolou et al., "Deploying Wireless Sensor/Actuator Networks and RFID for Handoff Enhancement", Second International Conference on Computational Intelligence, Modelling and Simulation (CIMSiM 2010), Tuban, Indonesia, Sep. 28, 2010, pp. 457-463.

Papapstolou et al., "Handoff Management Relying on RFID Technology", 2010 IEEE Wireless Communications & Networking Conference (WCNC 2010), Sydney, Australia, Apr. 18, 2010, pp. 1-6.

Liu et al., "The Study on the Effectiveness for the Handoff of WLAN and RFID", The IET International Conference on Frontier Computing, Theory, Technologies and Applications, Taichung, Taiwan, Aug. 4, 2010, pp. 227-234.

Anonymous, "Part 11: Wireless LAN Medium Access Control (MAC) and Physical Layer (PHY) specifications", IEEE Standard 802.11, Information Technology—Telecommunications and information exchange between systems—Local and metropolitan area networks—Specific requirements, IEEE, New York, NY, USA, Jun. 26, 1997, pp. 1-459.

Al Nuaimi et al., "A Survey of Indoor Positioning Systems and Algorithms", 2011 international Conference on Innovations in Information Technology, Abu Dhabi, United Arab Emirates, Apr. 25, 2011, pp. 185-190.

Guerrieri et al., "RFID-Assisted Indoor Localization and Communication for First Responders", European Conference on Antennas and Propagation, Nice, France, Nov. 6, 2006, pp. 1-6.

Gottipati, "With iBeacon, Apple is going to dump on NFC and embrace the Internet of things", gigaom.com, Sep. 10, 2013, pp. 1-18.

Brchan et al., "A Real-time RFID Localization Experiment Using Propagation Models", 2012 IEEE International Conference on RFID, Orlando, Florida, USA, Apr. 3, 2012, pp. 141-148.

Pathanawongthum et al., "RFID based Localization Techniques for Indoor Environment", 12 th International Conference on Advanced Communication Technology (ICACT), Phoenix Park, Gangwon-Do, Korea, Feb. 7, 2010, pp. 1418-1421.

* cited by examiner

SYSTEM FOR IDENTIFYING A LOCATION OF A MOBILE TAG READER

This application claims the benefit, under 35 U.S.C. § 365 of International Application PCT/EP2015/077368, filed Nov. 23, 2015, which was published in accordance with PCT Article 21(2) on Jun. 2, 2016, in English, and which claims the benefit of European Patent Application No. 14306895.5 filed Nov. 26, 2014.

TECHNICAL FIELD

The present disclosure is directed to a radio frequency identification (RFID) tag system for locating where a mobile RFID reader is currently located.

BACKGROUND

Inferring a user's activity may be based on the knowledge of the room in which the user is located. For example, knowing whether the user is in the living room, in the kitchen or in his bedroom might be indicative of the user's activity. It may be desirable to use an RFID tag system for informing a remote recipient, for example, in which room of a building the user is presently located.

The use of an RFID reader is described in, for example, a published patent application No. WO 2005/071597. There, an RFID tag array-based "smart floor" system for navigation and location determination for guiding individuals includes a plurality of spaced apart RFID tags. Each RFID tag has memory having information stored therein including positional information and attributes of objects or structures disposed in proximity to the tags. The tags convey radio frequency (RF) signals including the positional information and the attributes in response to received electromagnetic excitation fields. The RFID tags are embedded within or rigidly attached to a walking surface, such as carpet pad, tile and wood flooring.

Long range RFID tag systems operating in the ultra high frequency (UHF) band have a range that is typically 12 m in line of sight (LOS) conditions. This range could be drastically reduced by any blockage of the RFID tag or RFID reader caused by various kinds of obstacles such as people or furniture that results in a shadowing effect.

In a preferred embodiment of an RFID system, the RFID reader communicates with passive RFID tags placed in judiciously chosen regions in, for example, different rooms. Each of the RFID tags includes a directive antenna that enables the RFID tags placed in a given room to have a range that reaches relevant locations within the given room. Advantageously, the directive antenna prevents or reduces the radiation range of the RFID tag from extending to an adjacent room sharing with the room where the RFID tag is attached to the same wall, ceiling or floor. The RFID tags are distributed in respective regions in a given room that are separated from one another in a manner to mitigate the shadowing effect. Advantageously, the RFID tags receive the interrogating RF signal transmitted only from a transmitter of the RFID reader situated, typically, in the room where the RFID tags are located. Conversely, advantageously, the RFID reader receives the RF signal transmitted, typically, only from RFID tags situated in the room where the RFID tag is located.

Because of multipath frequency selective fading, encountered in indoor environments, significant level variations of the received RF signal are experienced even within a distance of a few centimeters. FIG. 5 shows a graph presenting an example of variations of magnitudes of a received RF signal at UHF frequency within an indoor area having coordinates X and Y of 2 m×2 m, respectively. As shown in FIG. 5, variation of the RF signal of up to 40 dBm could be noticed over distances of a few tens of centimeters. Such fast fading signal could, disadvantageously, prevent the activation of one RFID tag even for a transmission from a close RFID reader, situated in the same room; whereas, another RFID tag, located in a nearby room could, disadvantageously, be activated and thus read by the RFID reader located in the room in which the one RFID tag is located. As illustrated in the graph of FIG. 6, a situation may happen in which an RFID tag located in a so-called fade at a region 66 with respect to a signal transmitted by an RFID reader situated in the same room. On the other hand, an RFID tag situated a different room might be located on a so-called crest 68.

In a preferred embodiment of an RFID system, the RFID tags are arranged in sets such as in pairs. In such an arrangement, the RFID tags of a given tag pair are close enough to each other to be considered as being located substantially in the same region of the room, yet far enough in a manner to mitigate the aforementioned well known small scale fading due to multipath propagation.

In a preferred embodiment of an RFID system, a long range RFID reader included, for example, in a smartphone or tablet may, advantageously, share common circuitry that also performs the functionality of a smart phone. For example, an inertial or motion sensor that is used for smart phone purposes in a smartphone can also be used for initiating the communication with the RFID tags when a movement of a user is detected. This feature, advantageously, reduces the energy consumption of the RFID reader for preserving a charge in a battery of the mobile device. Advantageously, the smartphone can, selectively, send the user location information via the cellular network if the user enables this feature or can, selectively, prevent sending the user location information when the user disables this feature.

SUMMARY

In carrying out a preferred embodiment, an RFID reader generates an output signal containing information indicative of a location, among a plurality of locations, in which the mobile RFID reader is likely to be located. The RFID reader includes a transmitter for transmitting an interrogating RF signal. The RFID reader includes a receiver for receiving responding RF signals in response to the interrogating RF signal. The responding RF signals include a first plurality of sets associated with a first plurality of regions, respectively, of a first location of the plurality of locations. The responding RF signals also include a second plurality of sets associated with a second plurality of regions, respectively, of a second location of the plurality of locations. The RFID reader includes a processor configured to select, in accordance with a selection criterion, a first magnitude of one of the responding RF signals in a first set of the first plurality of sets. The processor is configured to select, in accordance with a selection criterion, a second magnitude of one of the responding RF signals in a second set of the first plurality of sets. The processor is configured to combine the first and second magnitudes of the first plurality of sets. The processor is further configured to select, in accordance with a selection criterion, a first magnitude of one of the responding RF signals in a first set of the second plurality of sets. The processor is also configured to select, in accordance with a selection criterion, a second magnitude of one of the responding RF signals in a second set of the second plurality of sets. The processor is further configured to combine the selected first and second magnitudes of the second plurality of sets. The processor is additionally configured to compare a value indicative of the combined first and second magnitudes of the first plurality of sets with a value indicative of the combined first and second magnitudes of the second plurality of sets for generating, in accordance with the comparison, the output signal to contain the information in which location of the plurality of locations the RFID reader is likely to be located.

In a preferred embodiment, at least one of said responding RF signal sets is limited to a pair of responding RF signals.

In a preferred embodiment, combining said selected first and second magnitudes of said first plurality of sets is performed by summation of said selected first and magnitudes of said first plurality of sets.

In a preferred embodiment, combining said first and second magnitudes of said second plurality of sets is performed by summation of said first and magnitudes of said second plurality of sets.

In a preferred embodiment, the RFID reader is included in a mobile communication device that communicates said output signal via an antenna.

In a preferred embodiment, the RFID reader further comprises a motion detector and wherein said transmitter is responsive to an output of said motion detector for transmitting said interrogating RF signal that is initiated after said motion detector detects a motion of said RFID reader.

In a preferred embodiment, each set of said responding RF signal sets is generated in a corresponding RFID tag pair that includes at least a directive antenna.

In a preferred embodiment, said RFID tag pair is attached to a corresponding region of one of said first and second plurality of regions.

In a preferred embodiment, the pair of RFID tags forming said RFID tag pair are spaced from each other by a distance that is larger or equal to $\lambda/4$ and smaller than or equal to $\lambda/2$ based on a frequency of a responding RF signal of said plurality of responding RF signals originated in said pair of RFID tags.

In a preferred embodiment, said processor is configured to evaluate a probability that said mobile RFID reader is located in said likely location and a result of the probability evaluation is included in said output signal as an additional information.

In another embodiment, it is proposed a method for generating an output signal containing information indicative of a location among a plurality of locations in which a mobile RFID reader is likely to be located. Such method comprises:

transmitting an interrogating RF signal;

receiving responding RF signals in response to said interrogating RF signal, including a first plurality of sets of responding RF signals associated with a first plurality of regions, respectively, of a first location of said plurality of locations and a second plurality of sets of said responding RF signals associated with a second plurality of regions, respectively, of a second location of said plurality of locations;

selecting a first magnitude of one of said responding RF signals in a first set of said first plurality of sets in accordance with a selection criterion;

selecting a second magnitude of one of said responding RF signals in a second set of said first plurality of sets in accordance with a selection criterion;

combining said first and second magnitudes of said first plurality of sets;

selecting a first magnitude of one of said responding RF signals in a first set of said second plurality of sets in accordance with a selection criterion;

selecting a second magnitude of one of said responding RF signals in a second set of said second plurality of sets in accordance with a selection criterion;

combining said first and second magnitudes of said second plurality of sets;

comparing a value indicative of said combined first and second magnitudes of said first plurality of sets with a value indicative of said combined first and second magnitudes of said second plurality of sets; and generating, in accordance with the comparison, said output signal containing the information in which location of said plurality of locations said RFID reader is likely to be located.

In a preferred embodiment, in such method, at least one of said responding RF signal sets is limited to a pair of responding RF signals.

In a preferred embodiment, in such method, combining said first and second magnitudes of at least said first plurality of sets is performed by summation of said first and magnitudes of said first plurality of sets.

In a preferred embodiment, in such method, combining said first and second magnitudes of said second plurality of sets is performed by summation of said first and magnitudes of said second plurality of sets.

In a preferred embodiment, such method further comprises including said RFID reader in a mobile communication device that communicates said output signal via an antenna.

In a preferred embodiment, in such method, transmitting said interrogating RF signal is initiated after detecting a motion of said RFID reader.

In a preferred embodiment, in such method, each set of said responding RF signal sets is generated in a corresponding RFID tag pair.

In a preferred embodiment, such method further comprises attaching one of said RFID tag pair to a corresponding region of one of said first and second plurality of regions.

In a preferred embodiment, such method further comprises spacing the pair of RFID tags forming said RFID tag pair from each other by a distance that is larger or equal to $\lambda/4$ and smaller than or equal to $\lambda/2$ based on a frequency of a responding RF signal of said plurality of responding RF signals originated in said pair of RFID tags.

In a preferred embodiment, such method further comprises evaluating a probability that said mobile RFID reader is located in said likely location and including in said output signal additional information indicative of said probability.

In another embodiment, it is proposed a radio frequency (RF) identification (RFID) system, comprising:

a mobile RFID reader, including a transmitter for transmitting an interrogating RF signal;

a receiver for receiving responding RF signals in response to said interrogating RF signal;

a first plurality of pairs of RFID tags suitable to be installed in a first plurality of regions, respectively, of a first location of a plurality of locations for generating in a given RFID tag pair of said first plurality of pairs a corresponding pair of said responding RF signals, respectively, said given RFID tag pair being spaced from each other, when attached to a corresponding region of said first plurality of regions, by a distance that is larger or equal to $\lambda/4$ and smaller than or equal to λ/2 with respect to a frequency of a corresponding responding RF signals generated in said given RFID tag pair;

a second plurality of pairs of RFID tags suitable to be installed in a second plurality of regions, respectively, of a second location of said plurality of locations for generating in a given RFID tag pair of said second plurality of pairs a corresponding pair of said responding RF signals, respectively; and a processor responsive to said responding RF signals generated in said RFID tag pairs of said first and second locations for generating an output signal containing information indicative of a location, among said plurality of locations, in which said mobile RFID reader is likely to be located.

In a preferred embodiment, in such RFID tag system, said given RFID tag pair of said second plurality of pairs are spaced from each other, when attached to a corresponding region of said second plurality of regions, by a distance that is larger or equal to λ/4 and smaller than or equal to λ/2 with respect to a frequency of a corresponding responding RF signals generated in said given RFID tag pair of said second plurality of RFID tag pairs.

In a preferred embodiment, in such RFID tag system, each of said RFID tag pair is constructed on a common substrate.

In a preferred embodiment, in such RFID tag system, each of said RFID tag pair includes at least a directive antenna.

DETAILED DESCRIPTION

Figure 1:
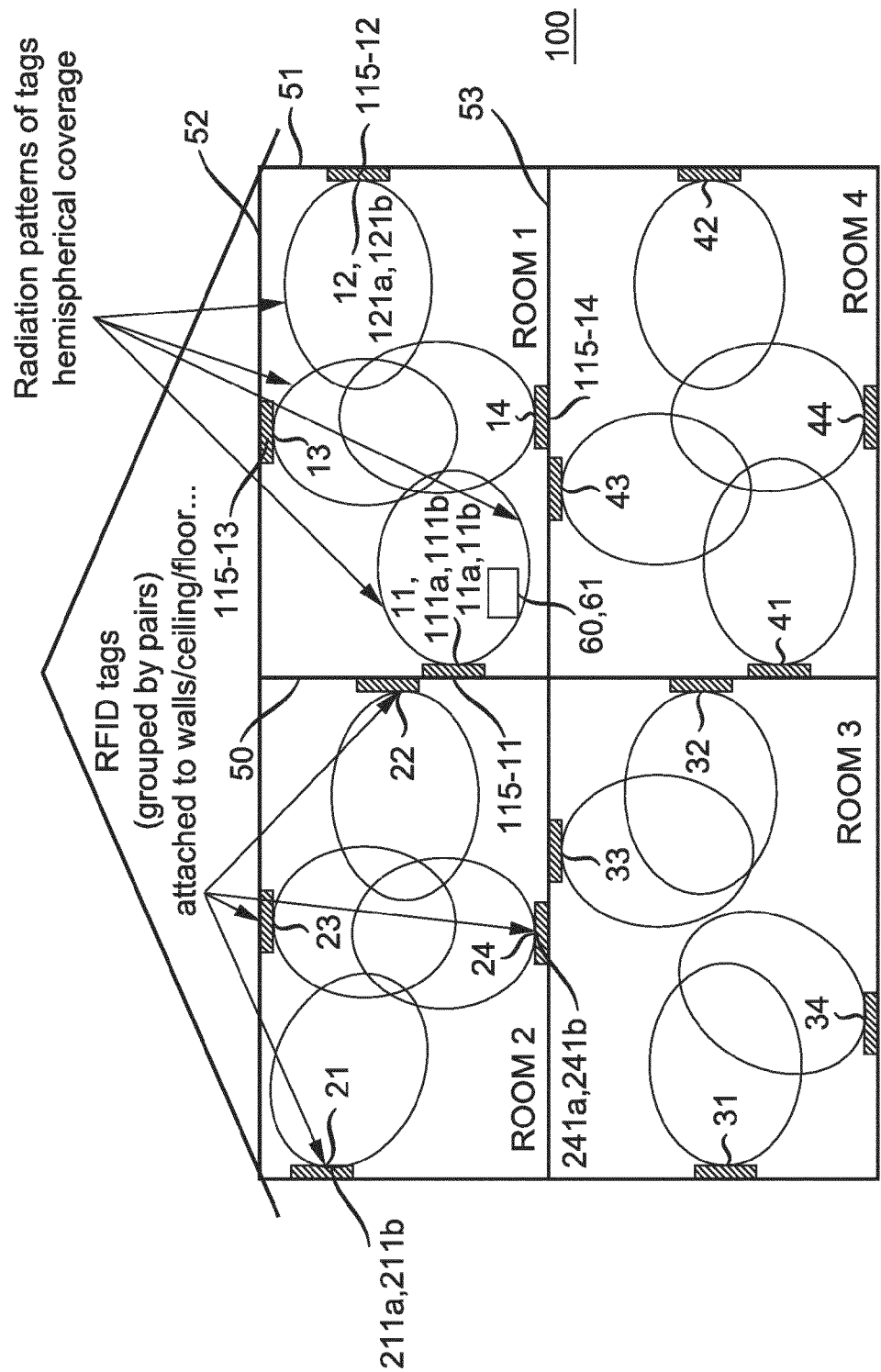
FIG. 1 schematically illustrates an example of a building having, in each room, RFID attached tag pairs, embodying a preferred embodiment.

FIG. 1 schematically illustrates an example of a building 100 having four locations or rooms, a room 1, a room 2, a room 3 and a room 4. In each room, for example, in room 1, four identical RFID tag sets, an RFID tag pair 11, an RFID tag pair 12, an RFID tag pair 13 and an RFID tag pair 14 are installed. RFID tag pairs 11, 12, 13 and 14 are spaced apart of each other so as to reduce the effect of shadowing. RFID tag pair 11 is embedded within or rigidly attached to a region 115-11 of a surface of a wall 50. Similarly, RFID tag pairs 12, 13 and 14 are embedded within or rigidly attached to a region 115-12 region, a region 115-13 and a region 115-14 of a surface of a wall 51, a ceiling 52 and a flooring 53, respectively. An RFID tag pair 21, an RFID tag pair 22, an RFID tag pair 23 and an RFID tag pair 24 are similarly installed in room 2. Likewise, an RFID tag pair 31, an RFID tag pair 32, an RFID tag pair 33 and an RFID tag pair 34 are similarly installed in room 3. Lastly, an RFID tag pair 41, an RFID tag pair 42, an RFID tag pair 43 and an RFID tag pair 44 are similarly installed in room 4.

Figure 2:
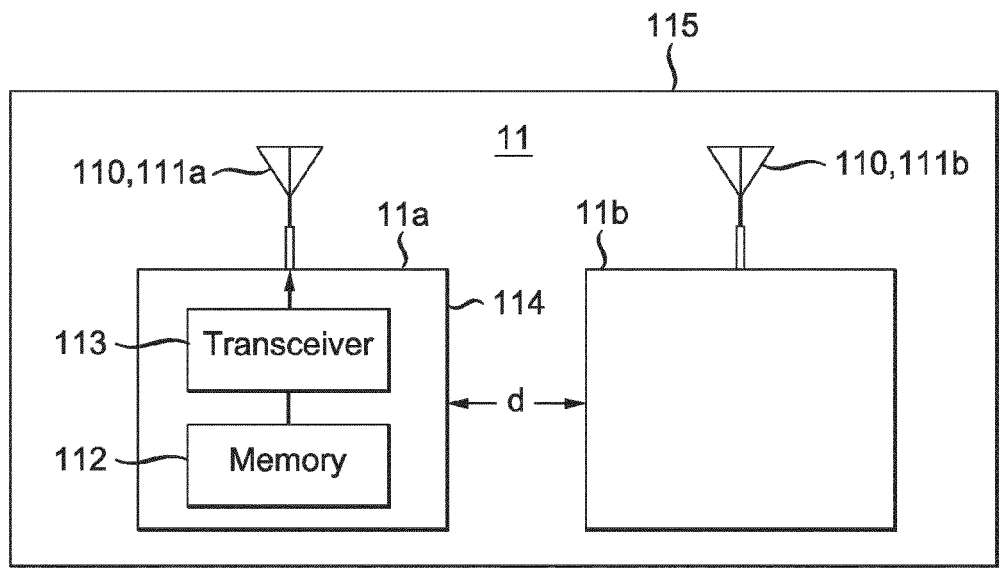
FIG. 2 illustrates a partial block diagram of an RFID tag pair of FIG. 1.

RFID tag pair 11 of FIG. 2 forms a set that includes an RFID tag 11a and an RFID tag 11b, each being of the passive type that does not require wired connection to a power supply for energization. Similar symbols and numerals in FIGS. 1 and 2 indicate similar items or functions.

RFID tag 11a, for example, of FIG. 2 is paper thin constructed on a flexible plastic substrate 115 with adhesive for its fixation. Substrate 115 may be optically transparent or may have the wall/ceiling color to be visually unobtrusive. RFID tag 11a includes an etched directional antenna 110 having a hemispherical or half space radiation coverage, a tiny chip 114 which includes a memory 112 for storing data and a transceiver 113 that is coupled to antenna 110 in a conventional manner. The data in memory 112 may contain an identifier, not shown, identifying the room and region in which RFID tag 11a is installed which, in this example, is room 1, region 115-11 and wall 50 of FIG. 1. It may also contain the RFID tag pair identifier which, in this example, identifies it as included in RFID tag pair 11 and having an identification portion that differentiates it from the other RFID tag 11b, of the same RFID tag pair 11. RFID tag 11b may be similarly constructed on flexible plastic substrate 115 as RFID tag 11a but is attached to wall 50 of FIG. 1 at a distance, d, from RFID tag 11a. RFID tag 11a and RFID tag 11b may be substantially identical except for the identifier, not shown, that differentiates RFID tag 11b from RFID tag 11a. Tag pair 11 is associated with region or portion 115-11 of wall 50 of room 1 of FIG. 1 where substrate 115 of FIG. 2 is attached.

Figure 3:
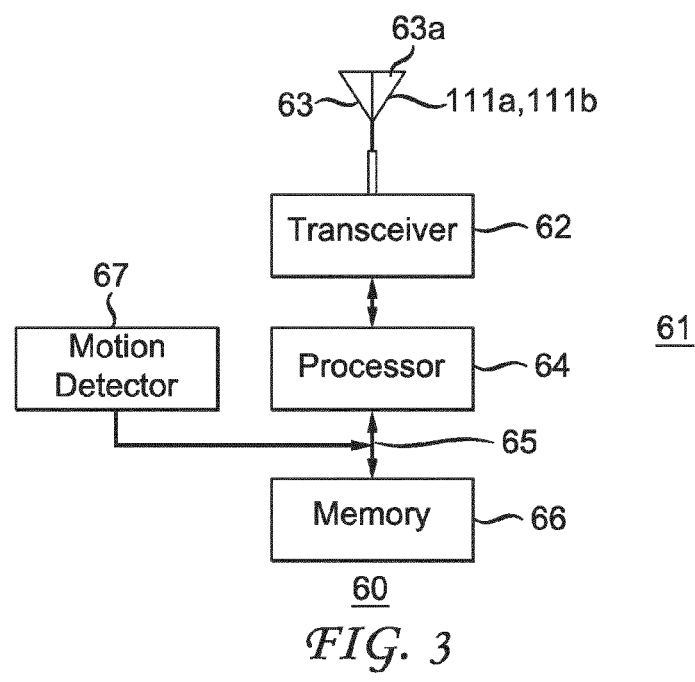
FIG. 3 illustrates a partial block of an RFID tag reader, embodying a preferred embodiment.

FIG. 3 illustrates a partial block of an RFID tag reader 61, embodying a preferred embodiment, which may be included in a mobile smart phone 60. Similar symbols and numerals in FIGS. 1, 2 and 3 indicate similar items or function. When smart phone 60 that contains Reader 61 of FIG. 3 is carried by a user, not shown, it can be used for identifying, for example, a room from among rooms 1-4 of FIG. 1 where such user is currently located or that such user is not located in any of rooms 1-4, as the case may be. In the example FIG. 1, smart phone 60 that includes reader 61 is shown as being located in room 1.

RFID reader 61 of FIG. 3 includes a processor 64 which may be realized as a digital signal processor (DSP). Processor 64 is coupled to a bus 65 for coupling processor 64 to a memory 66 and to a motion detector 67 such as an accelerometer. Processor 64 is coupled via an RFID transceiver 62 to an antenna 63. The operation of processor 64 is explained in connection with a flow chart of FIG. 4. Similar symbols and numerals in FIGS. 1, 2, 3 and 4 indicate similar items or functions.

Figure 4:
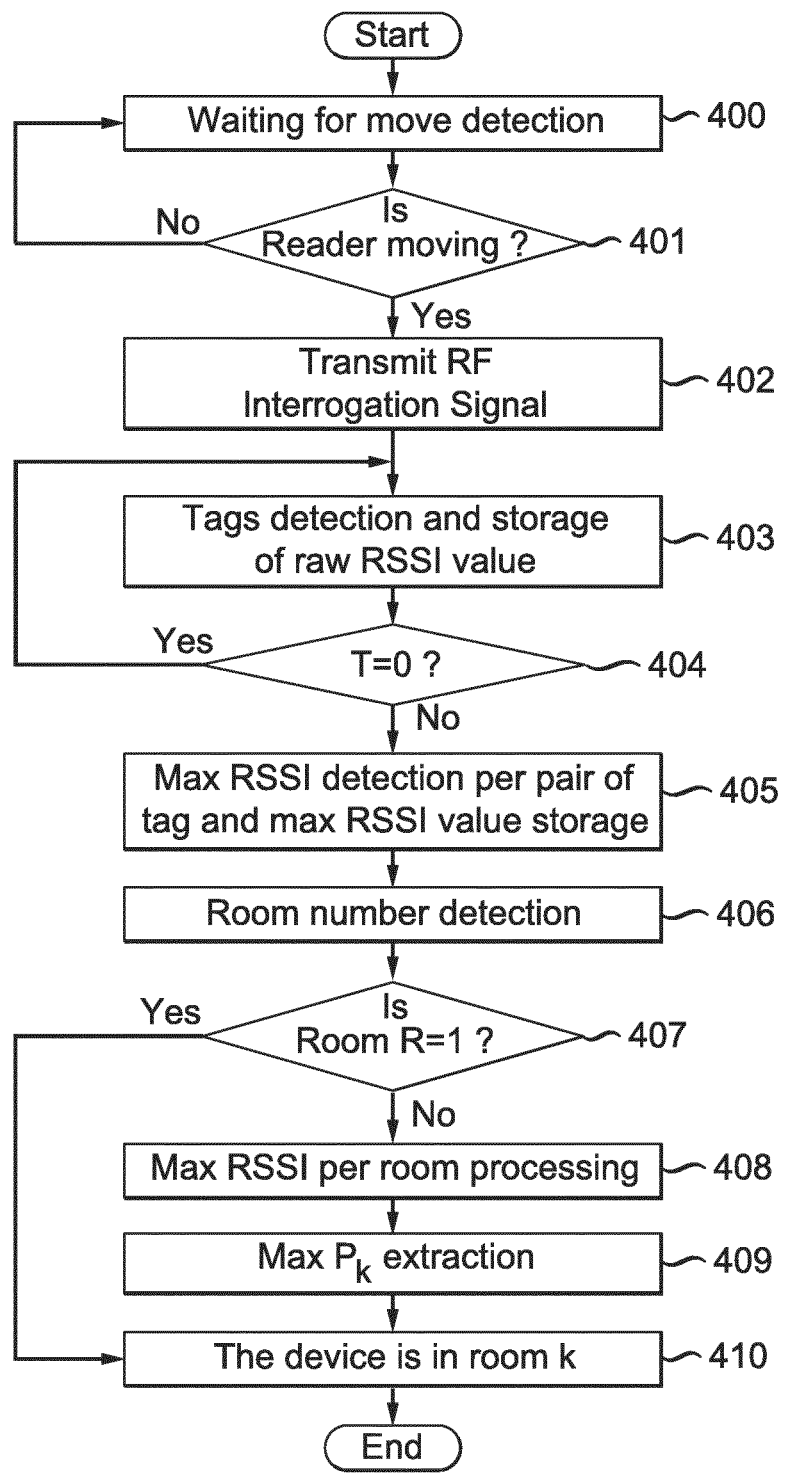
FIG. 4 illustrates a flow chart for explaining the operation of a processor of FIG. 3.
Figure 5:
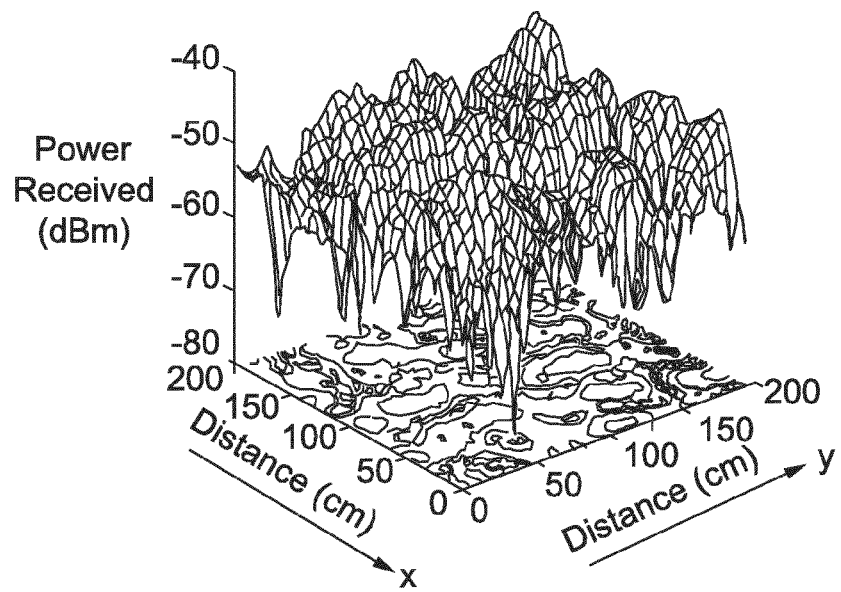
FIG. 5 illustrates graph presenting an example of variations of magnitudes of a received RF signal.
Figure 6:
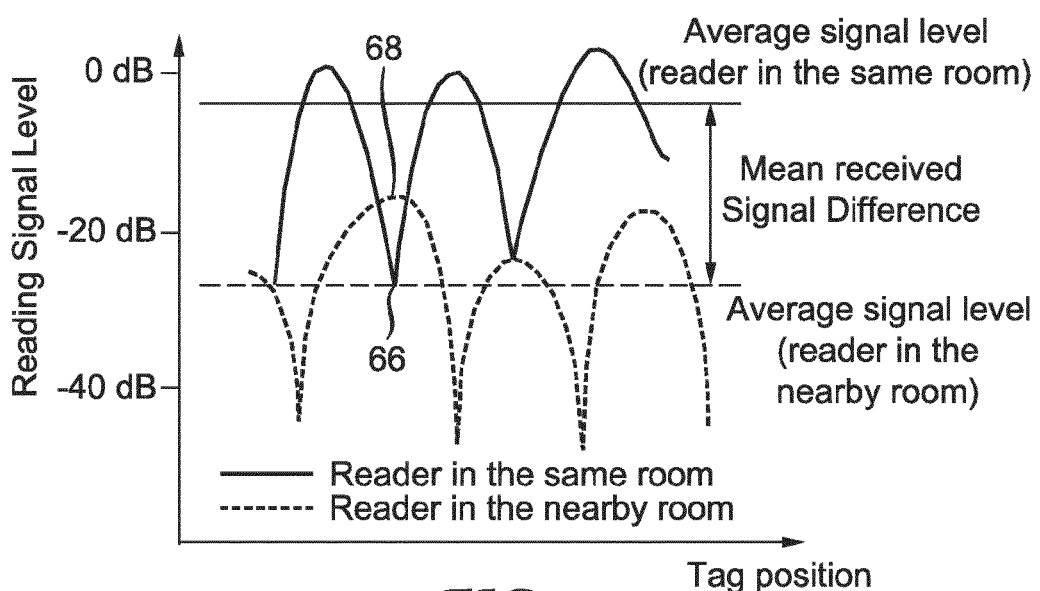
FIG. 6 illustrates a graph demonstrating a fading effect of a received RF signal.

In an operation block 400 of FIG. 4, processor 64 of FIG. 3 waits for a movement or motion indication, not shown, from motion detector 67. The movement indication is tested in a decision block 401 of FIG. 4 to determine whether smart phone 60 including RFID tag reader 61 has been moved. When motion detector 67 is indicative of a movement of portable RFID reader 61, the result is "yes" in decision block 401 of FIG. 4. Consequently, in a block 402, processor 64 of FIG. 3 is triggered to generate a transmission of an interrogation or selection RF signal 63a that is modulated to contain an address for sequentially and selectively addressing each RFID tag, for example, RFID tag 11a of FIG. 2 of tag pair 11 of FIG. 1. By not initiating the communication unless and until motion detector 67 becomes indicative of a movement of portable reader 61, current consumption of RFID reader 61 is, advantageously, reduced in a manner to conserve a charge in a battery, not shown, of smart phone 60.

It is known to use a variety of techniques to transmit and receive data to and from the corresponding RFID tag including amplitude modulation (AM), phase modulation (PM), and frequency modulation (FM). Furthermore, the data transmitted can be encoded using any of a variety of techniques, including frequency shift keying (FSK), pulse position modulation (PPM), pulse duration modulation (PDM), and amplitude shift keying (ASK).

In the example of FIG. 1, RFID tag 11a of FIG. 2 is exposed to an RF field produced by antenna 63 of FIG. 3. Consequently, it absorbs energy from the RF transmissions of antenna 63 of reader 61 and uses the absorbed energy for energizing chip 114 of FIG. 2 to perform data retrieval and data transmission. Upon decoding transmission of interrogation or selection RF signal 63a of FIG. 3 that targets, for example, RFID tag 11a, the aforementioned information stored in memory 112 of RFID tag 11a of FIG. 2 is transmitted by antenna 110 and, in this example, a corresponding responding RF signal 111a is received via antenna 63 of reader 61 of FIG. 3.

In an operational block 403 of FIG. 4, Processor 64 of FIG. 3 detects responding RF signal 111a and stores in memory 66 a corresponding Receiver Signal Strength Indicator (RSSI) value that is indicative of a magnitude of responding RF signals 111a received from RFID tag 11a of FIG. 2 of tag pair 11. In addition, processor 64 of FIG. 3 stores in memory 66 the corresponding identifier information such as the room number that, in this example, is room 1 and a number identifying RFID tag number 11a that are associated with responding RF signal 111a. Similarly, RFID reader 61 of FIG. 3 communicates with RFID tag 11b of FIG. 2 and with each of the remaining RFID tags of RFID tag pairs 12-14, 21-24, 31-34 and 41-44 of FIG. 1, during a sequence of time slots, respectively, not shown. The result is that the corresponding RSSI value of each responding RFID signal, if any, generated in RFID tag pairs 11-14, 21-24, 31-34 and 41-44 of FIG. 1 along with the corresponding identifiers are stored in memory 66 of FIG. 3.

If no responding RF signal is received by processor 64 of FIG. 3 from any of the targeted RFID tags of RFID tag pairs 11-14, 21-24, 31-34 and 41-44 of FIG. 1, represented by, T=0, in a decision block 404 of FIG. 4, processor 64 of FIG. 3 will keep sending transmission of interrogation, as suggested by the "yes" path of decision block 404. On the other hand, if at least one responding RF signal has been received, the "no" answer of decision block 404 indicates that an operation block 405 will follow.

In operation block 405 of FIG. 4, processor 64 of FIG. 3 selects the largest (or larger, in the case of two RF signals) stored RSSI value of a set of responding RF signals originated in each responding RFID tag pair. For example, assume that a responding RF signal 111a of FIGS. 1 and 2 has a larger RSSI value than that of a responding RF signal 111b, originated in RFID tags 11a and 11b, respectively, of FIG. 2 of RFID tag pair 11 of room 1 of FIG. 1. Therefore, the RSSI value of responding RF signal 111a will be selected. This would also be applicable in the special situation in which RF signals 111a is received but no RF signal 111b is received. As indicated before, tag pair 11 is associated with region 115-11 of a portion of wall 50 of room 1 of FIG. 1 where substrate 115 of FIG. 2 is attached. Similar communication process is applied with respect to each of the other responding RF signals originated in the corresponding RFID tag pairs 12-14, 21-24, 31-34 and 41-44 of FIG. 1. For example, a stored RSSI value associated with a responding RF signal 121a of a set of RF signals that includes RF signal 121a and an RF signal 121b might be selected for tag pair 12; whereas, in this example, a stored RSSI value of responding RF signal 121b will not be selected. Similarly, a stored RSSI value associated with a responding RF signal 211a might be selected for tag pair 21; whereas, in this example, a stored RSSI value of a responding RF signal 211b will not be selected. Likewise, a stored RSSI value associated with a responding RF signal 241a might be selected for tag pair 24; whereas, in this example, a stored RSSI value of a responding RF signal 241b will not be selected.

Thereafter, in an operation block 406 and a decision block 407, processor 64 of FIG. 3 determines, in accordance with the information stored in memory 66, whether each of the responding RF signals has originated in a single room. In this example, it would be room 1 of FIG. 1. In the majority of situation, it is more likely that all responding RF signals originate in a single room. Thus, if the answer in decision block 407 of FIG. 4 is "yes", processor 64 of FIG. 3 determines in an operation block 410 that RFID reader 61 is located, in this example, in room 1.

On the other hand, in rarely occurring situations, not all the responding RF signals originate in a single room, resulting in the answer, "no", in the aforementioned decision block 407 of FIG. 4. Therefore, an operation block 408 will follow. Thus, operation block 408 follows when RFID reader 61 receives in addition to, for example, responding RF signal 111a that originated in Room 1 of FIG. 1 also, for example, a responding RF signal 211a and/or a responding RF signal 211b. Responding RF signals 211a and signal 211b originated from RFID tag 21 of room 2 that is outside room 1 in which RFID reader 61 is presently located. Similarly, RFID reader 61 might receive, in addition, for example, a responding RF signal 241a and/or a responding RF signal 241b originated from RFID tag 24 of room 2. In operation block 408 and in the following operation block 410 processor 64 of FIG. 3 determines the room in which RFID reader 61 is more likely to be located.

A responding RF signal originated in, for example, tag pair 21 might be subject to the aforementioned multipath frequency selective fading problem encountered in indoor environments. Consequently, counter-intuitively, received responding RF signal 211a might happen to be even larger than received responding RF signals 111a from room 1 of FIG. 1 in which RFID reader 61 is presently located. This could have lead to an identification error resulting in false determination that room 2 is the room in which RFID reader 61 is presently located, instead of room 1 where it is actually located. To avoid such an error, the RFID tags of each RFID tag pair, for example, RFID tags 11a and 11b of the set of RFID tag pair 11 of FIG. 2 are separated from each other by the aforementioned distance, d.

In carrying out a preferred embodiment, distance, d, is selected to be greater than the coherence distance, $\lambda/4$, associated with the frequency of the radiated RF signal which, at 900 MHz, is approximately 8 cm. However, distance, d, is also selected to be smaller than $\lambda/2$ which at 900 MHz is approximately 16 cm. Because distance, d, is greater than the coherence distance, $\lambda/4$, it is unlikely that, for example, both RFID tags 11a and 11b will simultaneously encounter the multipath frequency selective fading problem. Thus, the multipath frequency selective fading problem that may be encountered in indoor environment such as in room 1-room 4 of FIG. 1 is, advantageously, mitigated.

In the example referred to before, each selected responding RF signal 111a, 121a, 211a and 241a has the larger RSSI value generated in the corresponding RFID tag pair. In operation block 408 of FIG. 4, the stored RSSI values of all the selected larger responding RF signals from the tag pairs of the corresponding room, for example, of RF signals 111a and 121*a* originated in room 1 of FIG. 1 are combined or summed up to produce a first sum. Similarly, the stored RSSI values of all the selected larger responding RF signals, for example, RF signals 211*a* and 241*a*, originated in room 2 are also combined or summed up to produce a second sum. Similar operation is performed with respect to the stored RSSI values of all selected responding RF signals, if any, associated with each of rooms 3 and 4 to produce a third sum, if any, and a fourth sum, if any, respectively.

As shown in the example of FIG. 1, the number of RFID tag pairs in each of rooms 1-4 is equal to that in each of the other rooms. Accordingly, processor 64 of FIG. 3 compares the first, second, third and fourth sums to one another for selecting the largest of the first, second, third and fourth sums. Processor 64 determines that the room where RFID reader 61 is the most likely to be located is the room associated with the largest of the first, second, third and fourth sums. In addition, processor 64 calculates the probability that RFID reader 61 of FIG. 3 is located in such room that is equal to a fraction having the largest of the first, second, third and fourth sums, as a numerator, and a sum total of the first, second, third and fourth sums, as a denominator.

Assume that the number of RFID tag pairs in rooms 1-4 of FIG. 1 is unequal in a manner not shown in FIG. 1. Accordingly, processor 64 of FIG. 3 divides each of the first, second, third and fourth sums by the number of RFID tag pairs in rooms 1, 2, 3 and 4, respectively, to produce a first average value, a second average value, a third average value and a fourth average value, respectively. Processor 64 of FIG. 3 compares the first, second, third and fourth average values to one another for selecting the largest of the first, second, third and fourth average values. The room where RFID reader 61 is most likely to be located is the room associated with the largest of the first, second, third and fourth average values. In addition, processor 64 calculates in an operation block 409 of FIG. 4 the probability, $P_k$, that RFID reader 61 of FIG. 3 is located, in such room, by calculating a fraction having the largest of the first, second, third and fourth average values, as a numerator, and a sum total of the first, second, third and fourth average values, as a denominator.

Let $S_{ij}$ be defined as the Maximum RSSI from a tag pair number j in room number i. Room number i assumes the value 1, 2, ... or R, such that "R" is also the total number of rooms. Tag pair number j assumes the values 1, 2, 3, ... or $T_i$ such that "$T_i$" is also the total number of tagged pairs in room i 1. in Case where all the Rooms have the Same Number of Tag Pairs, for all i's $T_i$ is Equal to T.

For each room k, RFID reader 61 of FIG. 3 calculates, a sum $S_k$ of all Maximum RSSI obtained from the tag pairs situated in a room k. Let $S_{kj}$ be defined as the Maximum RSSI of tag pair number j in room k. It follows that $S_k = \Sigma_j S_{kj}$; j=1, ..., T. Thus, the room where RFID reader 61 of FIG. 3 is most likely to be located is the room number for which the highest value $S_k$ is obtained. Also, the probability $P_k$ that the user is located in room k could be estimated as $P_k = S_k/S$ where S is the sum total of all the $S_k$'s or $S = \Sigma_k S_k$.

2. In Case where the Number of Tag Pairs is not the Same in all the Rooms, $T_k$ Represent the Number of Tag Pairs in a Room k.

For each room k, RFID reader 61 of FIG. 3 calculates the average value of the Maximum of RSSI from tag pairs j situated in room k, denoted as $Sav_k$. Thus, $$Sav_k = S_k/T_k; \text{ with } S_k = \Sigma_j S_{kj}; j=1,2,\ldots,T_k.$$

The room where RFID reader 61 of FIG. 3 is located is the room number for which the highest value of $Sav_k$ is obtained. The probability, $P_k$, that the user is located in room k could be estimated as $P_k = Sav_k/Sav$, where Sav is the sum of all $Sav_k$ or $Sav = \Sigma_k Sav_k$; k=1, 2, ..., R.

The invention claimed is:

1. A RFID reader comprising:
a transmitter for transmitting an interrogating RF signal;
a receiver for receiving, in response to said interrogating RF signal, responding RF signals, said responding RF signals including a first plurality of sets associated with a first location of a plurality of locations and a second plurality of sets associated with a second location of said plurality of locations; and
a processor configured to select, in accordance with a selection criterion, a first and a second magnitudes respectively of a first and a second responding RF signals in respectively a first and a second sets of said first plurality of sets, said processor being configured to combine said selected first and second magnitudes of said first plurality of sets,
said processor being further configured to select, in accordance with the selection criterion, a further first and a further second magnitudes respectively of a further first and a further second responding RF signals in respectively a first and a second sets of said second plurality of sets, said processor being configured to combine said selected further first and further second magnitudes of said second plurality of sets,
said processor being additionally configured to compare a value indicative of said combined first and second magnitudes of said first plurality of sets with a further value indicative of said combined further first and further second magnitudes of said second plurality of sets for generating, in accordance with the comparison, an output signal to contain an information in which location of said plurality of locations said RFID reader is located.

2. The RFID reader according to claim 1, wherein combining said selected first and second magnitudes of said first plurality of sets is performed by summation of said selected first and second magnitudes of said first plurality of sets.

3. The RFID reader according to claim 1, wherein combining said further first and further second magnitudes of said second plurality of sets is performed by summation of said further first and further second magnitudes of said second plurality of sets.

4. The RFID reader according to claim 1, further comprising a motion detector and wherein said transmitter is responsive to an output of said motion detector for transmitting said interrogating RF signal that is initiated after said motion detector detects a motion of said RFID reader.

5. The RFID reader according to claim 1, wherein each set of said responding RF signal sets is generated in a corresponding RFID tag pair that includes at least a directive antenna.

6. The RFID reader according to claim 5, wherein said RFID tag pair is attached to a corresponding region of one of said first and second plurality of regions.

7. The RFID reader according to claim 6, wherein the pair of RFID tags forming said RFID tag pair are spaced from each other by a distance that is larger or equal to $\lambda/4$ and smaller than or equal to $\lambda/2$ based on a frequency of a responding RF signal of said plurality of responding RF signals originated in said pair of RFID tags.

8. The RFID reader according to claim 1 wherein said processor is configured to evaluate a probability that said RFID reader is located in said location and wherein a result of the probability evaluation is included in said output signal as an additional information.

9. A method comprising:
transmitting an interrogating RF signal;
receiving responding RF signals in response to said interrogating RF signal, including a first plurality of sets of responding RF signals associated with a first location of a plurality of locations and a second plurality of sets of said responding RF signals associated with a second location of said plurality of locations;
selecting a first and a second magnitudes respectively of a first and a second responding RF signals in respectively a first and a second sets of said first plurality of sets in accordance with a selection criterion;
combining said first and second magnitudes of said first plurality of sets;
selecting a further first and a further second magnitudes respectively of a further first and a further second responding RF signals in respectively a further first and a further second sets of said second plurality of sets in accordance with the selection criterion;
combining said further first and further second magnitudes of said second plurality of sets;
comparing a value indicative of said combined first and second magnitudes of said first plurality of sets with a value indicative of said combined further first and further second magnitudes of said second plurality of sets; and
generating, in accordance with the comparison, an output signal containing an information in which location of said plurality of locations said RFID reader is located.

10. The method according to claim 9, wherein combining said first and second magnitudes of at least said first plurality of sets is performed by summation of said first and second magnitudes of said first plurality of sets.

11. The method according to claim 9, wherein transmitting said interrogating RF signal is initiated after detecting a motion of said RFID reader.

12. The method according to claim 9 wherein each set of said responding RF signal sets is generated in a corresponding RFID tag pair.

13. The method according to claim 12 wherein the first and second plurality of sets are respectively associated with a first and a second plurality of regions, said RFID tag pair being attached to a corresponding region of one of said first and second plurality of regions.

14. The method according to claim 13 further comprising spacing the pair of RFID tags forming said RFID tag pair from each other by a distance that is larger or equal to $\lambda/4$ and smaller than or equal to $\lambda/2$ based on a frequency of a responding RF signal of said plurality of responding RF signals originated in said pair of RFID tags.

15. A RFID system, comprising:
a mobile RFID reader, including
a transmitter for transmitting an interrogating RF signal;
a receiver for receiving responding RF signals in response to said interrogating RF signal;
a first plurality of pairs of RFID tags suitable to be installed in a first plurality of regions, respectively, of a first location of a plurality of locations for generating in a first given RFID tag pair of said first plurality of pairs a corresponding pair of said responding RF signals, respectively, said first given RFID tag pair being spaced from each other, when attached to a corresponding region of said first plurality of regions, by a distance;
a second plurality of pairs of RFID tags suitable to be installed in a second plurality of regions, respectively, of a second location of said plurality of locations for generating in a second given RFID tag pair of said second plurality of pairs a corresponding pair of said responding RF signals, respectively, said second given RFID tag pair being spaced from each other, when attached to a corresponding region of said second plurality of regions, by a distance; and
the mobile RFID reader further comprising a processor responsive to said responding RF signals generated in said first given and second given RFID tag pairs of said first and second locations for generating an output signal containing information indicative of a location, among said plurality of locations, in which said mobile RFID reader is located.

16. A computer-readable storage medium storing computer-executable program instructions to enable a computer to perform the method comprising:
transmitting an interrogating RF signal;
receiving responding RF signals in response to said interrogating RF signal, including a first plurality of sets of responding RF signals associated with a first location of a plurality of locations and a second plurality of sets of said responding RF signals associated with a second location of said plurality of locations;
selecting a first and a second magnitudes respectively of a first and a second responding RF signals in respectively a first and a second sets of said first plurality of sets in accordance with a selection criterion;
combining said first and second magnitudes of said first plurality of sets;
selecting a further first and a further second magnitudes respectively of a further first and a further second responding RF signals in respectively a further first and a further second sets of said second plurality of sets in accordance with the selection criterion;
combining said further first and further second magnitudes of said second plurality of sets;
comparing a value indicative of said combined first and second magnitudes of said first plurality of sets with a value indicative of said combined further first and further second magnitudes of said second plurality of sets; and
generating, in accordance with the comparison, an output signal containing an information in which location of said plurality of locations said RFID reader is located.

* * * * *